Aug. 29, 1944.   F. E. CREVER   2,357,086
ELECTRIC SHIP PROPULSION SYSTEM
Filed Feb. 26, 1943
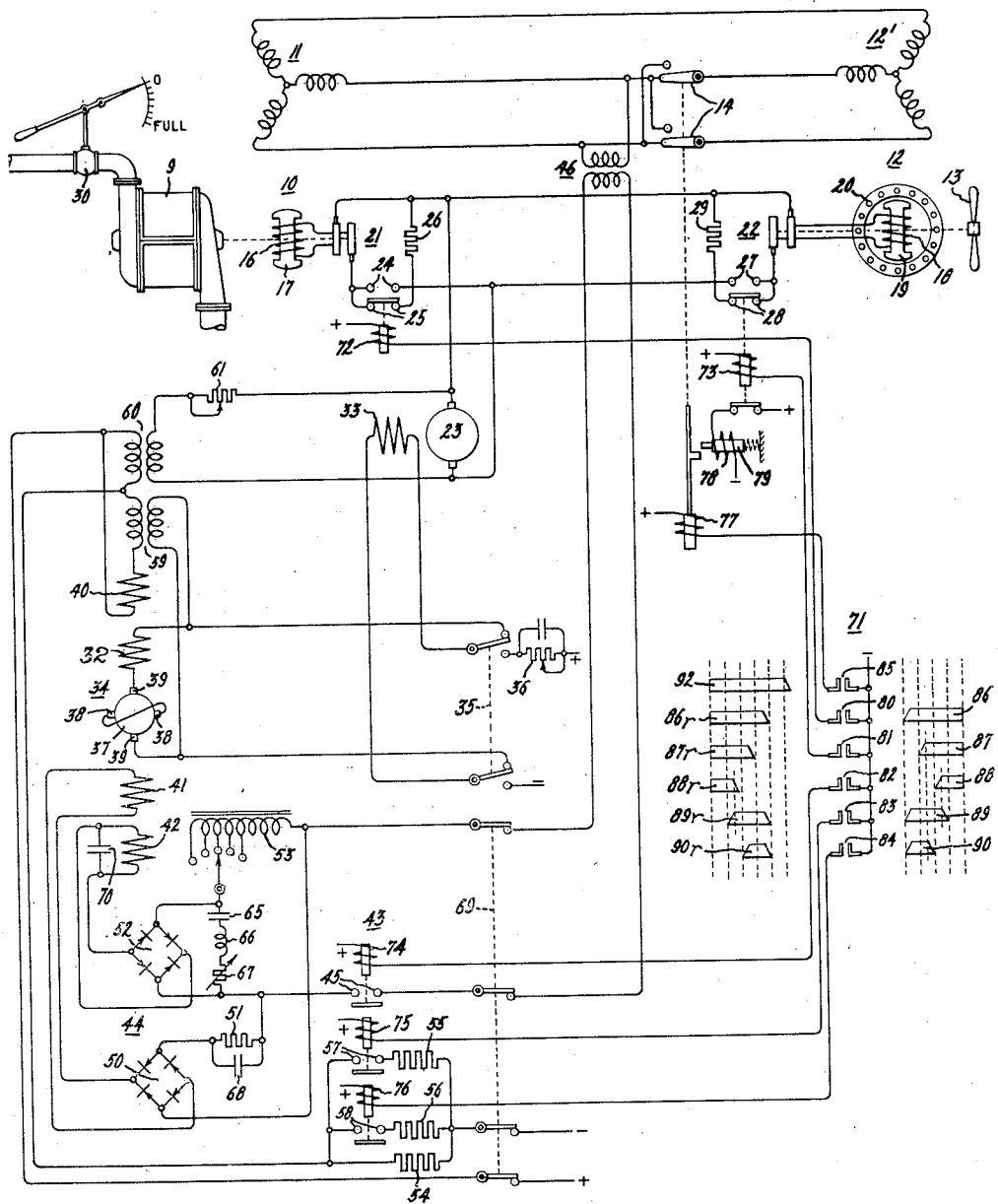
Inventor:
Frederick E. Crever,
by Harry E. Dunham
His Attorney.

Patented Aug. 29, 1944

2,357,086

UNITED STATES PATENT OFFICE 2,357,086

ELECTRIC SHIP PROPULSION SYSTEM

Frederick E. Crever, Scotia, N. Y., assignor to General Electric Company, a corporation of New York Application February 26, 1943, Serial No. 477,258

9 Claims. (Cl. 172—8)

My invention relates to the control and regulation of variable speed synchronous motors for the propulsion of ships and more particularly to such control which provides stable starting of motors and their regulated operation throughout the range of synchronous speeds of such ship propulsion systems.

Power systems employed for propelling ships are required to function within a wide range of speeds and loads and to withstand sudden changes of load. The sudden changes of load may be caused by conditions prevailing during high seas or when the ship is making a turn, or when it is being reversed. When synchronous motors are employed to drive the propellers of a ship, it is common practice to bring the motors up to their minimum synchronous speed by induction motor action. In order to meet the requirements of the wide range of speeds and loads, it is desirable to provide a regulator which will maintain a predetermined stable condition of operation, and it is also desirable that the regulator be placed in operation automatically. For example, a regulator may be employed that controls the field excitation of the motor and generator system to provide predetermined values of generator voltage. If the regulator is placed in operation when the system is started, it will allow the current of the generator to increase to a value as much as twice normal. This is a desirable condition since increased excitation facilitates the starting of the motor as an induction motor. However, as the motor comes up to speed and its terminal voltage falls, the regulator tends to reduce the excitation which begins to approach the normal value determined by the regulator setting. As a result, there is danger that the motor will fall out of step or drop its load. Accordingly, it is an object of my invention to provide a ship propulsion system employing a synchronous generator and a synchronous motor and including an improved arrangement for starting the motor and for regulating its operation.

It is another object of my invention to provide a ship propulsion system employing a synchronous generator and a synchronous motor and including an improved arrangement whereby the system may be maintained in stable operation throughout wide changes of load and whereby the propeller may be reversed in a minimum time without causing the motor to lose its load.

In order to obtain the desired characteristics of a ship propulsion system of the above type particularly when the motor is to be operated in synchronism at low speeds, it is necessary that the automatic regulator be able to vary the excitation in accordance with the predetermined desired characteristics. For example, the system may be operated so that the ratio of the generator voltage to its frequency remains substantially constant. However, it may be desirable to vary this characteristic during operation at lower speeds.

It is a further object of my invention to provide a ship propulsion system employing a synchronous generator and motor and including an improved regulator for maintaining a predetermined stable characteristic throughout the range of speeds of the system.

Further objects and advantages of my invention will become apparent as the following description proceeds, and the features of novelty which characterize my invention will be pointed out with particularity in the claims annexed to and forming a part of this specification.

For better understanding of my invention reference may be had to the accompanying drawing, the single figure of which represents schematically an electric ship propulsion system embodying my invention.

Briefly the ship propulsion system shown on the drawing comprises an alternating current generator driven by a variable speed steam turbine and connected to supply power to a synchronous motor. A regulator is provided for maintaining a predetermined characteristic, for example, a constant ratio between the voltage of the generator and its frequency. The regulation and excitation system includes a main exciter and a sub-exciter. The sub-exciter is a special direct current amplifying generator which, for convenience, is referred to herein as an Amplidyne. The Amplidyne has a very high amplification ratio and a very low time constant, and it may be controlled by simple control circuits having no moving parts and substantially no time lag. The Amplidyne is provided with a separately excited direct current field which maintains a predetermined polarity of the exciter voltage and which is also employed to provide greater increased field excitation during the starting of the propulsion motor as an induction motor. The regulating or control field windings are provided on the Amplidyne to determine the characteristic to be maintained by the regulator. For example, these fields may comprise buck and boost fields energized in response to the generator voltage, the boost field being supplied from a circuit having a linear characteristic and the buck field from a circuit having a nonlinear characteristic, the direct current for the fields being obtained by means of rectifiers in the respective circuits. These control fields are brought into operation only after the motor has been brought up to synchronous speed. Variations in the characteristics to betained by the control fields may be secured, for example, by employing a series resonant circuit in shunt with the input of the rectifier in the nonlinear circuit or by providing a condenser in shunt with a resistance connected in series with the rectifier in the linear circuit.

The electric ship propulsion system illustrated in the drawing comprises an alternating current generator 10 driven by a variable speed steam turbine 9 and arranged to supply power to a synchronous alternating current motor 12 for driving a propeller 13. Armature windings 11 arranged on the stator of the generator 10 are connected to supply power to armature windings 12' arranged on the stator of the motor 12; a suitable switch 14 is provided for reversing the motor. The generator 10 is provided with a field winding 16 mounted on a rotor 17 and the motor 12 is provided with a field winding 18 mounted on a rotor 19. The rotor 19 is provided with a squirrel cage winding 20 to facilitate starting of the motor 12 as an induction motor. The field windings 16 and 18 are connected in parallel through sets of slip rings 21 and 22, respectively, to be energized by an exciter 23. A switch 24 is provided for connecting the field winding 16 to the exciter and includes a back contact 25 for shorting this winding through a suitable resistor 26. The motor is provided with a similar switch 27 having a back contact 28 and a shorting resistor 29. The turbine 9 is provided with a throttle valve 30 for varying the speed of the turbine to change the speed of the generator and its frequency for driving the motor at corresponding speeds.

The exciter 23 is provided with a field winding 33 which is connected to be energized by a pilot exciter 34. A switch 35 is provided so that, when desired, the field 33 may be energized from a separate source of direct current, a manually operated resistance 36 being provided to control the field when it is excited from the separate source. The pilot exciter 34 is an Amplidyne and it together with its control fields is arranged to regulate the excitation of the exciter 23 in order to obtain stable operation for all loads and speeds of the system. The construction and operation of an Amplidyne generator are described in United States Letters Patent 2,227,992, granted January 7, 1941, to Ernst F. W. Alexanderson and Martin A. Edwards and assigned to the same assignee as the present invention. The Amplidyne consists essentially of a conventional direct current dynamo electric machine armature and commutator 37 provided with a set of short circuited brushes 38 whose commutating axis is electrically in quadrature to the commutating axis of a set of load brushes 39. The main operating flux of the machine, that is to say the flux which produces the generated electromotive force between the load brushes 39, is produced by the armature reaction of the current flowing between the short circuited brushes. The normal armature reaction of the exciter is substantially neutralized by a series winding 32. The resistance of the circulating path between the short circuited brushes is relatively low and the electromotive force for producing the flow of relatively heavy short circuit current which produces the large cross armature reaction flux is produced by magnetomotive forces resulting from the energization of the control windings 40, 41 and 42. The total magnetomotive produced by these control windings is relatively small. The control winding 40 is energized from a suitable source of direct current in series with a field control panel or network 43. The windings 41 and 42 are differentially connected boosting and bucking windings, respectively, which are energized by a regulator 44 connected through a switch 45 to a potential transformer 46 and responsive to the voltage of the generator 10.

The circuit of the regulator for energizing the boost winding 41 is arranged to have a linear impedance-current characteristic and comprises a rectifier 50 energized from the potential transformer 46 through a resistance 51; the regulator circuit for energizing the winding 42 has a non-linear impedance-current characteristic and comprises a rectifier 52 energized from the potential transformer 46 through a saturating reactor 53 which is provided with taps to determine the voltage at which it saturates. The minimum value of current in the separately excited control winding 40 is determined by a resistance 54 in the network 43. The network is also provided with resistances 55 and 56 arranged to be connected in parallel with the resistance 54 by switches 57 and 58, respectively. The control winding 40 determines the polarity of the Amplidyne 34 by insuring that it will always build up its voltage in the same direction. Winding 40 is also employed as a stabilizing or anti-hunting winding, the secondaries of transformers 59 and 60 being connected in the circuit of the winding 40 so that voltages representing the rates of change of the Amplidyne and the exciter voltages, respectively, are introduced in the circuit of the winding 40. The directions of these voltages are such as to set up magnetomotive forces in the field of the Amplidyne 34 which oppose the changes. The resistance of the primary winding of the transformer 59 is sufficiently high that the primary winding of this transformer may be connected directly across the terminals of the Amplidyne. An adjustable resistance 61 is provided in series with the primary winding of the transformer 60 in order to determine the value of the stabilizing force introduced through the transformer 60.

The regulator 44 controls the pilot exciter 34 to maintain a substantially constant ratio between the voltage and frequency of the generator 10. The operation of the regulator 44 is such that equilibrium is established between the boost and buck fields 41 and 42 such that their resultant ampere turns are just sufficient to excite the Amplidyne 34 to a value which causes the generator 10 to produce an alternating current voltage sufficient to saturate the reactor 53. Since the voltage at which the reactor saturates varies directly with frequency the regulator may be designed to hold a constant ratio between the voltage and frequency of the generator.

In some systems, it may be desirable for example, to decrease the ratio of the voltage to the frequency at lower frequencies in order to obtain more economical operation and less heating in the field windings. This characteristic might become desirable for example in some ship propulsion installations where the great decrease of the propeller torque at lower speeds renders it unnecessary to provide full voltage. In order to reduce the ratio of the voltage of the generator to its frequency at lower frequencies, a series resonant circuit comprising a condenser 65, an inductance 66 and an adjustable resistance 67 may be connected across the input terminals of the rectifier 52. This series circuit may be tuned to a frequency in the upper portion of the range so that as the frequency of the generator falls less current flows through the resonant circuit and the current in the bucking winding 42 will be increased and therefore will reduce the voltage of the generator 10. A similar correction of the voltage-frequency characteristic may be obtained by providing a condenser 68 shunting the resistance 51 in the linear circuit supplying the rectifier 50; then, as the frequency falls, the circuit becomes somewhat non-linear and the drop across the parallel circuit comprising the resistance 51 and condenser 68 falls and the magnetomotive force produced by the boost winding 41 is reduced and the voltage of the generator 10 is lowered accordingly. It is readily apparent that the above compensating arrangement for the linear and non-linear circuits of the regulator 44 makes it possible to obtain a wide range of voltage-frequency characteristic. Furthermore, non-linearity in the reactor 53 may be corrected by such compensating arrangements.

In order to smooth out the direct current voltage produced by the rectifier 52 and particularly to prevent high voltage peaks which might be caused by the saturation of the reactor 53, a condenser 70 is provided across the terminals of the bucking winding 42.

A switch 69 is provided so that the regulator 44 and exciter 34 may be disconnected from the direct current source and from the potential transformer 46. During synchronous operation the angle of displacement between the rotor of the generator 10 and the rotor of the motor 12 varies as a function of the torque, this in turn varies the alternating current voltage of the generator. The regulator acts in response to the generator voltage to maintain the ratio of voltage to frequency substantially constant; this insures high excitation and a high margin of stability during torque peaks. If the regulator were not provided, it would be necessary to employ a continuous fixed excitation which would be relatively low with respect to that required during the torque peaks. Relatively low excitation would be necessary since continuous excitation is limited by the heat dissipating capacities of the motor and generator fields; the system would therefore have a much lower ability to maintain stability during the torque peaks. Since the voltage across the exciter 23 is the voltage across the field windings 16 and 18, sudden changes in the currents in the field windings, which are produced when the angle of displacement changes, produce voltages in the field windings which represent the rate of change of the angle; and the stabilizing or anti-hunting effect produced by the transformer 60 in the control winding 40 prevents hunting of the system. The system may, therefore, be maintained in synchronism over wide range of loads and speeds with a minimum normal torque margin, that is, with a minimum excitation in addition to that necessary to maintain synchronism at any given set of conditions. The general arrangement of a ship propulsion system arranged to provide stable operation in this manner is described and claimed in a copending application of Ernst F. W. Alexanderson, Serial No. 477,259, filed February 26, 1943, and assigned to the same assignee as the present application.

In the operation of the ship propulsion system shown in the drawing, it is necessary that the motor 12 be started as an induction motor and brought up to the minimum speed at which the motor and generator are operated synchronously. This minimum speed, for example, may be 15 per cent of full speed. Furthermore, it is necessary to prevent the possibility of the motor's falling out of step during the starting operation and before the regulator can take over the control and maintain stable operation. In order to insure starting of the motor without danger of dropping the propeller load, the regulator control windings 41 and 42 are maintained deenergized by the opening of the switch 45 and the switches 57 and 58 are closed to provide minimum resistance of the network 43 so that the winding 40 is energized to a maximum value providing very high excitation for the generator field 16. For induction motor operation, the field 18 is, of course, short circuited through the resistance 29, the switch 27 being opened. This high value of excitation is maintained until the motor 12 comes up to the speed at which it may be synchronized. The field excitation is then reduced by opening the switch 57 to cutout the resistance 55 and simultaneously the switch 27 is closed to energize the motor field 18. This provides a relatively high value of excitation during the synchronizing of the motor and generator; and, after a predetermined time delay, which insures synchronizing of the motor and generator, the switch 58 is opened to reduce the excitation of the control field 40 to its minimum or normal value and simultaneously the switch 45 is closed to place the pilot exciter 34 under control of the regulator 44.

In order to effect the starting and reversing operations automatically, there is provided a controller 71 arranged to energize switch operating coils 72, 73, 74, 75, 76 and 77 for operating the switches 24, 25, 27, 28, 45, 57, 58 and 14, respectively. An interlocking coil 78 is provided so that the reversing switch 14 may not be moved from one position to the other unless the coil 78 is energized by closing of the back contacts of the switch 27 in circuit therewith to retract an armature 79. The controller 71 is provided with contacts 80, 81, 82, 83, 84 and 85 which when closed by cams 86, 87, 88, 89, 90 and 92 energize the coils 72, 73, 74, 75, 76 and 77 respectively. When the controller 71 is moved for starting the ship ahead, it initially places its cams 86, 89 and 90 in position to close its contacts 80, 83 and 84, thereby placing maximum separate excitation on the controlling field winding 40 of the exciter 34 and energizing the generator field winding 16 to a high value of excitation. Further movement of the controller 71 opens its contacts 84 and closes its contacts 81 by means of cams 90 and 87. This energizes the motor field winding for synchronizing the motor and generator and simultaneously reduces the separate excitation of the control winding 40 to a value which is still substantially above the normal value of excitation. After a predetermined time delay, which may be obtained by regulating the speed at which the controller may be moved to its next point of operation, the contacts 83 are opened and the contacts 82 are closed by the cams 89 and 88 of the controller 71. This reduces the separate excitation of the control winding 40 to its minimum or normal value and closes the switch 45 to place the exciter 34 under control of regulator 44. When the controller 71 is moved to its "astern" position to reverse the motor 12, the controller initially moves its reversing cam 92 to close its contacts 85 and energize the coil 77 to move the switch 14 to its "reverse" position. The remainder of the reverse operation sequence is the same as the forward sequence described above and is controlled by corresponding cams designated by the same numerals as the forward position cams with the addition of the letter "r." The control of the speed of the ship after the controller 71 has been operated to synchronize the motor 12 is accomplished by varying the speed of the turbine 9 by operation of the throttle valve 30. It has been found that the arrangement described above for starting and synchronizing the motor and for placing the system under control of the regulator 44 makes it possible to start or reverse the motor in a much shorter time than was the practice heretofore so that a ship provided with the above propulsion system may be reversed to full speed ahead and brought up to full speed astern in a very short time without danger of having the motor drop its load or fall out of synchronism. Furthermore, the operation of the regulator is such that stable operation is obtained for all loads throughout the range of synchronous speeds. Characteristic curves suitable for the requirements of any particular installation may readily be selected by varying the components of the input circuits of the rectifiers 50 and 52, as by changing the value of the reactor 53 and by the use of the series resonant circuit 65, 66, 67 or the condenser 68.

While I have shown a particular embodiment of my invention in connection with a ship propulsion system, other applications will readily be apparent to those skilled in the art. I do not, therefore, desire that my invention be limited to the particular arrangement shown and described, and I intend in the accompanying claims to cover all modifications within the spirit and scope of my invention.

What I claim as new and desire to secure by Letters Patent of the United States is:

1. An electric ship propulsion system comprising a variable speed alternating current generator and a synchronous alternating current propeller driving motor connected thereto, field windings for said generator and said motor, a direct current exciter for energizing said field windings, means including a regulator arranged to control said exciter for maintaining a predetermined electrical characteristic during synchronous operation of said motor, means for energizing said exciter independently of said regulator to provide a predetermined high value of separate excitation on said generator field for starting said motor as an induction motor, means for decreasing said separate excitation to an intermediate value and for energizing the field of said motor to synchronize said motor and said generator, and means operable at a predetermined time after the energization of said motor field for lowering said separate excitation to its normal value and for connecting said regulator to control the operation of said exciter.

2. An electric ship propulsion system comprising a variable speed alternating current generator having a field winding and an alternating current motor connected to said generator and having a field winding, means for connecting said motor as an induction motor for starting and as a synchronous motor for its normal speed range, means including a cross-armature-reaction-excited direct current exciter for energizing said field windings, a series field winding on said exciter for substantially neutralizing the normal armature reaction of said exciter, first and second and third control field windings on said exciter, means for energizing said first control winding from a source of direct current to determine the polarity of said exciter and for providing high separate excitation during induction motor operation, and means dependent upon the connection of said motor for synchronous motor operation for decreasing said separate excitation and for connecting said second and third control windings to be responsive to the voltage of said generator for differentially energizing said second and third windings to maintain a substantially constant ratio between the voltage and frequency of said generator.

3. An electric ship propulsion system comprising a variable speed alternating current generator having a field winding and an alternating current motor connected to said generator and having a field winding, means for connecting said motor as an induction motor for starting and as a synchronous motor for its normal speed range, means including a cross-armature-reaction-excited direct current exciter for energizing said field windings, a series field winding on said exciter for substantially neutralizing the normal armature reaction of said exciter, first and second and third control field windings on said exciter, means for energizing said first control winding to provide high separate excitation of said generator field during the induction motor starting operation and for reducing said excitation upon energization of said motor field to synchronize said motor and said generator, and means for connecting said second and third control windings for energizing said second and third control windings differentially in response to the voltage of said generator and for further reducing the energization of said first control winding a predetermined interval after energization of said motor field winding whereby said exciter is regulated to maintain a predetermined electrical characteristic of said system.

4. An electric ship propulsion system comprising a variable speed alternating current generator and a synchronous propeller driving motor, field windings for said generator and said motor, means including a cross-armature-reaction-excited direct current exciter for energizing said field windings, a series field winding on said exciter for substantially neutralizing the normal armature reaction of said exciter, means including a control field winding on said exciter and responsive to an electrical condition of said system for regulating said exciter for controlling said system to maintain a predetermined electrical characteristic, means including a separately energized control field winding on said exciter for determining the polarity of said exciter and for providing a high value of field excitation, means for energizing said separately energized control field winding to its full value to start said motor as an induction motor and for lowering the excitation of said field upon energization of said motor field to effect synchronization of said motor, and time delay means for connecting said regulating means to control the operation of said exciter and regulate the synchronous operation of said motor a predetermined interval after the energization of said motor field.

5. An electric ship propulsion system comprising a variable speed alternating current generator having a field winding and an alternating current motor connected to said generator and having a field winding, means for connecting said motor as an induction motor for starting and as a synchronous motor for its normal speed range, means including a cross-armature-reaction-excited direct current exciter for energizing said field windings, a series field winding on said exciter for substantially neutralizing the normal armature reaction of said exciter, first and second and third control field windings on said exciter, means for separately exciting said first control winding from a source of direct current and for providing three steps of excitation, the first of said steps providing abnormally high excitation, the third step providing normal excitation, and the second step an intermediate value of excitation, means applying said first step for starting said motor as an induction motor, means applying said second step and energizing said motor field winding for synchronizing said motor, and means applying said third step and connecting said second and third control windings to be responsive to the voltage of said generator for differentially energizing said second and third windings to maintain a predetermined electrical characteristic of said system a predetermined interval of time after energization of said motor field winding for placing said system in condition for operation within the range of synchronous speeds of said motor.

6. A variable speed motor control system comprising a variable speed alternating current generator and an alternating current motor connected thereto, a field winding for said generator, means including a cross-armature-reaction-excited direct current exciter for energizing said field winding, a series field winding on said exciter for substantially neutralizing the normal armature reaction of said exciter, first and second and third control windings on said exciter, means dependent upon an electrical condition of said generator for differentially energizing said second and third control windings to maintain a predetermined electrical characteristic of said system, means for connecting said first control winding to a separate direct current source for energizing said first control winding to determine the polarity of said exciter, and means for introducing in the circuit of said first control winding a voltage proportional to the rate of change of excitation voltage produced by said exciter to produce a damping force and prevent sustained oscillations of said motor and generator.

7. A variable speed motor control system comprising a variable speed alternating current generator and an alternating current motor connected thereto, a field winding for said generator, means including a cross-armature-reaction-excited direct current exciter for energizing said field winding, a series field winding on said exciter for substantially neutralizing the normal armature reaction of said exciter, first and second control field windings on said exciter, means dependent upon the voltage of said generator for differentially energizing said first and second control windings to maintain a predetermined voltage-frequency characteristic of said system, said means including a first rectifier and an input circuit for said rectifier having a linear impedance-current characteristic for supplying said first control winding and a second rectifier having a non-linear impedance-current characteristic for supplying said second winding, and means dependent upon variations in the frequency of said generator voltage for varying the impedance-current characteristic of one of said circuits in the lower portion of the frequency range of said system.

8. A variable speed motor control system comprising a variable speed alternating current generator and an alternating current motor connected thereto, a field winding for said generator, means including a cross-armature-reaction-excited direct current exciter for energizing said field winding, a series field winding on said exciter for substantially neutralizing the normal armature reaction of said exciter, first and second control field windings on said exciter, means dependent upon the voltage of said generator for differentially energizing said first and second control windings to maintain a predetermined voltage frequency characteristic of said system, said means including a first rectifier and an input circuit for said rectifier having a linear impedance current characteristic for supplying said first control winding and a second rectifier having a non-linear impedance current characteristic for supplying said second winding, and means including a tuned series resonant circuit connected in shunt with said second rectifier input circuit for lowering the voltage-frequency characteristic of said system in the lower portion of the frequency range of said system.

9. A variable speed motor control system comprising a variable speed alternating current generator and an alternating current motor connected thereto, a field winding for said generator, means including a cross-armature-reaction-excited direct current exciter for energizing said field winding, a series field winding on said exciter for substantially neutralizing the normal armature reaction of said exciter, first and second control field windings on said exciter, means dependent upon the voltage of said generator for differentially energizing said first and second control windings to maintain a predetermined voltage frequency characteristic of said system, said means including a first rectifier and an input circuit for said rectifier having a linear impedance current characteristic for supplying said first control winding and a second rectifier having a non-linear impedance current characteristic for supplying said second winding, and means including a condenser and a resistance in parallel and connected in series in said first rectifier input circuit for lowering the voltage-frequency characteristic of said system in the lower portion of the frequency range of said system.

FREDERICK E. CREVER.